(12) United States Patent
Leaming

(10) Patent No.: US 7,127,649 B2
(45) Date of Patent: Oct. 24, 2006

(54) SMARTCARD TEST SYSTEM AND RELATED METHODS

(75) Inventor: Taylor J. Leaming, Austin, TX (US)

(73) Assignee: STMicroelectronics, Inc., Carrollton, TX (US)

( * ) Notice: Subject to any disclaimer, the term of this patent is extended or adjusted under 35 U.S.C. 154(b) by 469 days.

(21) Appl. No.: 10/457,294

(22) Filed: Jun. 9, 2003

(65) Prior Publication Data

US 2004/0250191 A1    Dec. 9, 2004

(51) Int. Cl.
*G01R 31/28* (2006.01)

(52) U.S. Cl. .................. 714/715; 714/738; 714/741

(58) Field of Classification Search .................. None
See application file for complete search history.

(56) References Cited

U.S. PATENT DOCUMENTS

| | | | |
|---|---|---|---|
| 5,847,372 A | 12/1998 | Kreft | 235/492 |
| 5,991,546 A | 11/1999 | Chan et al. | 395/882 |
| 6,070,208 A | 5/2000 | Brief | 710/104 |
| 6,122,676 A | 9/2000 | Brief et al. | 710/9 |
| 6,168,077 B1 | 1/2001 | Gray et al. | 235/375 |
| 6,173,355 B1 | 1/2001 | Falik et al. | 710/129 |
| 6,311,294 B1 | 10/2001 | Larky et al. | 714/44 |
| 6,353,867 B1 | 3/2002 | Qureshi et al. | 710/129 |
| 6,439,464 B1 | 8/2002 | Fruhauf et al. | 235/492 |
| 6,618,685 B1 * | 9/2003 | Bender et al. | 702/119 |
| 6,651,149 B1 * | 11/2003 | Iwasaki | 711/163 |
| 6,793,144 B1 * | 9/2004 | Guez et al. | 235/492 |
| 6,880,752 B1 * | 4/2005 | Tarnovsky et al. | 235/382 |
| 2001/0034593 A1 | 10/2001 | Cooke et al. | 703/14 |
| 2002/0046016 A1 | 4/2002 | Debling | 703/28 |
| 2002/0065646 A1 | 5/2002 | Waldie et al. | 703/26 |
| 2002/0065966 A1 | 5/2002 | Brief | 710/100 |
| 2002/0066791 A1 | 6/2002 | Leydier et al. | 235/492 |
| 2002/0078283 A1 | 6/2002 | Purcell et al. | 710/109 |
| 2002/0162884 A1 * | 11/2002 | Speas et al. | 235/380 |
| 2003/0037225 A1 | 2/2003 | Deng et al. | 712/227 |

FOREIGN PATENT DOCUMENTS

WO    99/49415      9/1999
WO    01/96990    * 12/2001

OTHER PUBLICATIONS

LeCroy, "CATC Introduces Chief Plus USB Analyzer with Bus Traffic Generation Functionality", Sep. 14, 1999, http://www.lecroy.com/ProductPress/CATC_Archive/091599_Chief. asp?news_id=678&menuid=40, accessed Nov. 22, 2005 on the internet.*

* cited by examiner

*Primary Examiner*—Guy Lamarre
*Assistant Examiner*—John P. Trimmings
(74) *Attorney, Agent, or Firm*—Lisa K. Jorgenson; Christopher F. Regan

(57) ABSTRACT

A system of the present invention tests the design of a universal serial bus (USB) smartcard device and includes a bus analyzer for running test cases to generate USB bus traffic. A processor is operatively connected to the bus analyzer for receiving and transforming data about USB traffic into a selected data format that is usable across different smartcard development environments.

42 Claims, 16 Drawing Sheets

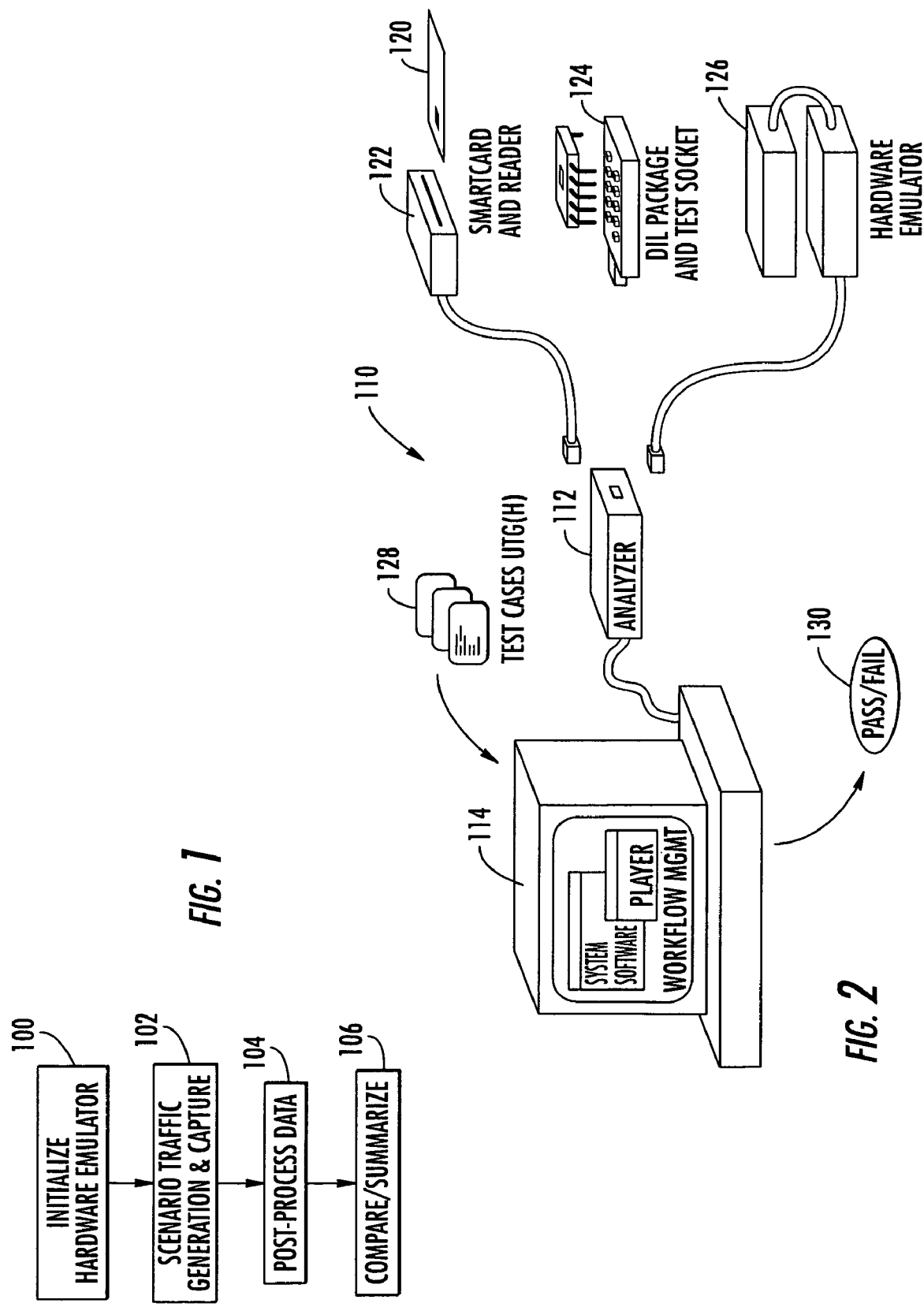

UTG USB TRAFFIC GENERATION * .UTG

DESCRIPTION
THE STANDARD USB GetDescriptor (CONFIGURATION) REQUEST IS USED BY THE HOST
CONTROLLER TO FIRST DETERMINE A DEVICE'S MaxPacketSize, THEN LATER TO OBTAIN
THE DEVICE'S ENTIRE DEVICE DESCRIPTOR.

SUMMARY:
THIS REQUEST, BY USB SPECIFICATION, SHOULD BE RECOGNIZED AND RESPONDED TO BY
A USB DEVICE AT ANY TIME. IT IS NOTED THAT "WELL-BEHAVED" DEVICES WILL BE
ABLE TO PROPERLY HANDLE HOST-ABANDONED GetDescriptor (CONFIGURATION) TRANSFERS
WHERE ONLY THE FIRST 8 BYTES ARE RECEIVED BY THE HOST AND THEN THE HANDSHAKE
PHASE IS ENTERED.

THIS REQUEST IS HANDLED BY THE OPERATING SYSTEM OF THE LoneStar DEVICE.
THE LoneStar DEVICE HAS ONLY A SINGLE CONFIGURATION, A SINGLE INTERFACE, AND
ITS DESCRIPTOR IS A TOTAL OF 18 BYTES.

THIS TEST CASE REQUESTS ALL 9 BYTES OF CONFIGURATION DESCRIPTOR, AND WAITS FOR
ALL BYTES TO BE SENT BY THE DEVICE BEFORE ENTERING THE HANDSHAKE PHASE.

FROM USB v1.1, SECTION 9.4.3:
  DEFAULT STATE:  THIS IS A VALID REQUEST WHEN THE DEVICE IS IN THE
           DEFAULT STATE.
  ADDRESS STATE:  THIS IS A VALID REQUEST WHEN THE DEVICE IS IN THE
           ADDRESS STATE.
  CONFIG'D STATE:  THIS IS A VALID REQUEST WHEN THE DEVICE IS IN THE
           CONFIGURED STATE.

BUS TRANSACTIONS:

1.) USB RESET (SE0)
  2.) SET ADDRESS ()
  3.) GETDESCRIPTOR ()

GET_DESCRIPTOR (CONFIG) : ADDR=0, ENDPT=0, BEHV=TYPICAL, TRAFFIC=BOTH

FRAME=KEEP_ALIVE IDLE=10        ; KEEP ALIVE

MARKER="GetDescriptor CONFIGURATION REQUEST <wLENGTH=12h>"

FROM FIGURE 5A

```
; TOKEN PHASE
;
PID=SETUP ADDR=0 ENDP=0 IDLE=10          ; SETUP PACKET TO DEV
PID=DATA0                                 ; DATA0 PACKET, GET_DESCRIPTOR REQUEST
   DATA=(80 06 00 02 00 00 12 00)         ; ALL BYTES FROM DEV IN DATA PHASE
   IDLE=10
PID=ACK IDLE=10                           ; <D> ACK PACKET, EXPECTED FROM DEV
; IDLE=BYTES_IN_4                         ; <W> WAIT FOR ACK, EXPECTED FROM DEV

; DATA PHASE
;

IDLE=250                                  ; COMPENSATE FOR OS RESPONSE TIME

PID=IN ADDR=0 ENDP=0 IDLE=10              ; IN PACKET REQUEST TO DEV
PID=DATA1                                 ; <D> DATA PACKET FROM DEV
   DATA=(09 02 12 00 01 01 00 80)         ; <D> (EXPECT 8 BYTES)
   IDLE=10                                ; <D>
; IDLE=BYTES_IN_8                         ; <W> WAIT FOR 8 DATA BYTES FROM DEV
PID=ACK IDLE=10                           ; ACK   PACKET FROM HOST

PID=IN ADDR=0 ENDP=0 IDLE=10              ; IN PACKET REQUEST TO DEV
PID=DATA0                                 ; <D> DATA PACKET FROM DEV
   DATA=(0F 09 04 00 00 00 00 00)         ; <D> (EXPECT 8 BYTES)
   IDLE=10                                ; <D>
; IDLE=BYTES_IN_8                         ; <W> WAIT FOR 8 DATA BYTES FROM DEV
PID=ACK IDLE=10                           ; ACK   PACKET FROM HOST

PID=IN ADDR=0 ENDP=0 IDLE=10              ; IN PACKET REQUEST TO DEV
PID=DATA1                                 ; <D> DATA PACKET FROM DEV
   DATA=(00 00)                           ; <D> (EXPECT 2 BYTES)
   IDLE=10                                ; <D>
; IDLE=BYTES_IN_2                         ; <W> WAIT FOR 2 DATA BYTES FROM DEV
PID=ACK IDLE=10                           ; ACK   PACKET FROM HOST

; STATUS/HANDSHAKE PHASE
;
PID=OUT ADDR=0 ENDP=0 IDLE=10             ; OUT PACKET HOST -> DEV TO HANDSHAKE
PID=DATA1                                 ; DATA PACKET TO DEV
   DATA=()                                ; (EXPECT ZERO-BYTE)
   IDLE=10
PID=ACK IDLE=10                           ; <D> ACK PACKET FROM DEV
; IDLE=BYTES_IN_4                         ; <W> WAIT FOR ACK FROM DEV
```

*FIG. 5B*

| PACKET# 0 TO 18 | |
|---|---|
| MARKER: 0 | TEST CASE: GTDSCC - 03TB<br>LS EOP (3.00) IDLE(10) |
| RESET (RESET.) | (500.000 μS) IDLE (10000) |
| 2 | LS EOP (3.00) IDLE(10) |
| MARKER:<br>PACKET# | SETADDRESS REQUEST <0->03h> |
| MARKER: 0 | K530 TEST CASE: GTDSCC -<br>LS EOP (3.00) IDLE(10) |
| RESET (RESET.) | (500.000 μS) IDLE (10000) |
| 2 | LS EOP (3.00) IDLE(10) |
| MARKER: 3 | GetDescriptor CONFIGURATION REQUEST <wLENGTH=12h><br>LS EOP (3.00) IDLE(8) |
| 4 | LS SYNC(00000001) SETUP(0xB4) ADDR (0) ENDP (0) CRC5 (0x08) EOP (3.00)<br>IDLE (10) |
| 5<br>— 0000 | LS SYNC(00000001) DATA0(0xC3) DATA(<br>80 06 00 02 00 00 12 00 )<br>CRC16(0x252F) EOP (3.00) IDLE (10) |
| 6 | LS SYNC(00000001) ACK(0x4B) EOP (3.00) IDLE (250) |
| 7 | LS SYNC(00000001) IN(0x96) ADDR (0) ENDP (0) CRC5 (0x08) EOP (3.00)<br>IDLE (10) |
| 8<br>— 0000 | LS SYNC(00000001) DATA1(0xD2) DATA(<br>09 02 12 00 01 01 00 80 )<br>CRC16(0x700D) EOP (3.00) IDLE (10) |
| 9 | LS SYNC(00000001) ACK(0x4B) EOP (3.00) IDLE (10) |
| 10 | LS SYNC(00000001) IN(0x96) ADDR (0) ENDP (0) CRC5 (0x08) EOP (3.00)<br>IDLE (10) |
| 11<br>— 0000 | LS SYNC(00000001) DATA0(0xC3) DATA(<br>0F 09 04 00 00 00 00 00 )<br>CRC16(0xE60C) EOP (3.00) IDLE (10) |
| 12 | LS SYNC(00000001) ACK(0x4B) EOP (3.00) IDLE (10) |
| 13 | LS SYNC(00000001) IN(0x96) ADDR (0) ENDP (0) CRC5 (0x08) EOP (3.00)<br>IDLE (10) |
| 14<br>— 0000 | LS SYNC(00000001) DATA1(0xD2) DATA(<br>00 00 ) CRC16(0x7FF2)<br>EOP (3.00) IDLE (10) |
| 15 | LS SYNC(00000001) ACK(0x4B) EOP (3.00) IDLE (10) |
| 16 | LS SYNC(00000001) OUT(0x87) ADDR (0) ENDP (0) CRC5 (0x08) EOP (3.00)<br>IDLE (10) |
| 17 | LS SYNC(00000001) DATA1(0xD2) DATA() CRC16(0x0000) EOP (3.00) IDLE (10) |

*FIG. 7*

PACKETS 0 TO 18
PACKET#

| MARKER: | TEST CASE: GTDSCC - |
| --- | --- |
| 0 | LS EOP (3.00) IDLE(10) |

RESET (RESET.) (500.000 μS) IDLE (10000)

```
FRAME=KEEP_ALIVE
   MARKER="K530 TEST CASE: GTDSCC
   SPEED=LOW IDLE=10
RESET=500 IDLE=TO_EOF
FRAME=KEEP_ALIVE SPEED=LOW IDLE=TO_EOF
FRAME=KEEP_ALIVE
   MARKER="GetDescriptor CONFIGURATION REQUEST <wLENGTH=12h>"
   SPEED=LOW IDLE=8
PID=SETUP ADDR=0 ENDP=0 SPEED=LOW EOP=3 IDLE=13
PID=DATA0
   DATA=(
      80 06 00 02 00 00 12 00
   )
   SPEED=LOW EOP=3 IDLE=13
PID=ACK SPEED=LOW EOP=3 IDLE=253
PID=IN ADDR=0 ENDP=0 SPEED=LOW EOP=3 IDLE=13
PID=DATA1
   DATA=(
      09 02 12 00 01 01 00 80
   )
   SPEED=LOW EOP=3 IDLE=13
PID=ACK SPEED=LOW EOP=3 IDLE=13
PID=IN ADDR=0 ENDP=0 SPEED=LOW EOP=3 IDLE=13
PID=DATA0
   DATA=(
      0F 09 04 00 00 00 00 00
   )
   SPEED=LOW EOP=3 IDLE=13
PID=ACK SPEED=LOW EOP=3 IDLE=13
PID=IN ADDR=0 ENDP=0 SPEED=LOW EOP=3 IDLE=13
PID=DATA1
   DATA=(
      00 00
   )
   SPEED=LOW EOP=3 IDLE=13
PID=ACK SPEED=LOW EOP=3 IDLE=13
PID=OUT ADDR=0 ENDP=0 SPEED=LOW EOP=3 IDLE=13
PID=DATA1
   DATA=( )
   SPEED=LOW EOP=3 IDLE=13
PID=ACK
   MARKER="END OF BUS SEQUENCE"
   SPEED=LOW EOP=3
```

FIG. 8

PACKETS 0 TO 25
PACKET#
────────┼──────────────────────────────────────────────────
MARKER:          TEST CASE: GTDSCC - 03TB
0_____¦ LS EOP (3.00) IDLE(10)

\#
\# KEYWORD <T> REQUEST_NAME <T> PACKET_NUMBER <T> DATA_PAYLOAD <T> COMMENT_STR
\#
ACK GetDescriptor [CFG] 6   80 06 00 02 00 00 12 00 GetDescriptor CONFIGURATION REQUEST
DA1 GetDescriptor [CFG] 8   09 02 12 00 01 01 00 80 GetDescriptor CONFIGURATION REQUEST
DA0 GetDescriptor [CFG] 11  0F 09 04 00 00 00 00 00 GetDescriptor CONFIGURATION REQUEST
DA1 GetDescriptor [CFG] 14  00 00 GetDescriptor CONFIGURATION REQUEST <wLENGTH=12h>
ACK GetDescriptor [CFG] 18        END OF BUS SEQUENCE

*FIG. 12*

SMARTCARD TEST SYSTEM AND RELATED METHODS

FIELD OF THE INVENTION

This invention relates to the field of information processing and storage, and more particularly, to smartcard development and testing and related methods.

BACKGROUND OF THE INVENTION

Smartcards are becoming increasingly more popular for security and personal identification applications. For example, smartcards are currently used for storing sensitive data such as medical records, banking information, and similar data requirements. In perhaps their most common form, smartcards have a card body that resembles a credit card in size, shape, and thickness, and may be made out of similar materials, for example, plastic. Rather than having a magnetic stripe to store sensitive information (e.g., account numbers, user identification, etc.) as standard credit cards do, smartcards generally include an integrated circuit (IC). The IC not only includes a non-volatile memory for storing sensitive data, but it may also include a microprocessor for processing this data and communicating with a host device via a card reader, for example. Not only can smartcards store more information than magnetic stripe cards, but also they have much greater functionality.

Various protocols have emerged to standardize the operation and communications of devices such as smartcards. One of the earliest of these was developed by the International Organization for Standardization (ISO) and is known as the ISO 7816-X protocol. In particular, this protocol is set forth in ISO documents ISO 7816-1 (Physical Characteristics), ISO 7816-2 (Dimensions and Locations of Contacts), ISO 7816-3 (Electronic Signals and Transmission Protocols), ISO 7816-10 (Electronic Signals and Answer to Reset for Synchronous Cards), and ISO 7816-12 (USB Interface) for example, all of which are hereby incorporated herein in their entirety by reference.

Furthermore, in response to the increasing popularity of the universal serial bus (USB) architecture, increasing numbers of smartcards continue to be developed which operate in accordance with the USB protocol. This protocol is set forth in the Universal Serial Bus Specification, Revision 2.0, Apr. 27, 2000, published by USB Implementers Forum, Inc., which is hereby incorporated herein in its entirety by reference. The USB architecture is particularly advantageous because it provides a standard "plug and play" interface for devices external to a computer, for example. External peripheral devices can be relatively quickly and easily installed and removed from a host device, e.g., a computer, without having to reboot or power down the computer.

Most product development cycles for complex computing systems or devices require a functional equivalent of the product before the final product is available. This functional equivalent is typically referred to as an emulator, or hardware emulator (HWE). The HWE allows the application developers for the product to develop and debug software applications for the device while the product engineers finalize and test the physical circuitry and/or components of the product.

With respect to smartcards, a HWE emulator is commonly used to develop, test, and debug new applications which will ultimately become embedded in the final smartcard integrated circuit. The HWE should provide functionality that matches as closely as possible the real-world functionality of the end product (e.g., a smartcard integrated circuit). This emulation should also be applicable to complicated dual-mode smartcards, such as dual ISO/USB smartcards. One such dual mode smartcard is described in U.S. Pat. No. 6,439,464 to Fruhauf et al., assigned to the assignee of the present invention, and which is hereby incorporated herein in its entirety by reference.

Electronic Design Automation (EDA) software tools are often used to simulate a smartcard (or other) chip design prior to prototyping or production. Designers often use a Hardware Description Language (HDL), such as Verilog® or VHDL, to define functional components and decompose them into smaller components. Software routines are placed and routed into logic cells at specific coordinate locations in a circuit layout.

Functional blocks, also called virtual component (VC) blocks, virtual components, or IP blocks, are often used by designers as pre-designed circuit functions. In many cases, these functional blocks are pre-hardened or semi-hardened circuit designs in software form that are re-used or recycled into larger circuit designs. The use of virtual component blocks reduces overall circuit design time and increases the speed a final design can reach market. These functional blocks as virtual components can also be pre-tested and verified from logical and functional standpoints.

Emulators often use functional blocks and a baseline architecture with the Virtual Socket Interface (VSI) for any "system-on-a-chip" (SoC) solution. Some functional blocks are specifically designed for use with a particular IC, and other functional blocks are designed for use with other IC's and obtained from internal company sources and/or external sources.

The Virtual Socket Interface (VSI) Alliance™ Architecture Document Version 1.0, the disclosure which is hereby incorporated by reference in its entirety, specifies the hardware and software interfaces, formats and design practices for creating functional blocks to enable efficient and accurate integration, verification and testing of multiple blocks on a single piece of silicon. The VSI standard is operative with an HDL description to allow IC design to be done using a component based solution. Virtual components as functional blocks are used in the design environment, and more particularly, a virtual socket design environment. Typically, virtual components can be soft, firm or hard. Usually a virtual component is a functional block designed to a set of specifications having an output that is a standard format with a pre-defined set of characteristics to simplify integration and verification.

In a design cycle for a USB smartcard, the design should be validated against as many test cases. Any modifications necessitate that it be re-validated against the test cases. Generation of test cases is a time-consuming and error-prone process. It has usually not been amenable to automation.

The development of a product, such as a USB smartcard device, requires work to be performed in multiple domains. Usually, engineers working in one domain produce test cases that are similar, but not necessarily identical, to those test cases developed in another domain. Test development within different domains is rarely shared. This duplication of efforts to develop these unshared tests is not necessary and is costly because it uses available resources and manpower. There is often little correlation between testing among different involved domains, yet much of the functionality requiring an exercise of skill is common across domains.

As of now, there has been no known mechanism for defining USB traffic patterns and scenarios, which may then be translated into a suitable format for a variety of development tools across the domains.

In the example of USB bus traffic, test cases and scenarios must be developed that exercise various portions of the hardware, software and firmware of a USB smartcard device. Any "expected" results should be crafted for each test case and scenario to compare against any collected "actual" data. Examination of the tools and techniques used in each domain reveal a strong correlation with respect to the nature of required test cases and scenarios.

Additionally, it is typical for each domain to use developers that are not common with the other domains. This could result from a particular expertise or skill of individual developers or when developers are separated by distance or time zones. As a result, it is common that the quality and quantity of tests, scenarios and data vary widely during the development process. There are also issues with cross-domain correlation. If all developers could agree upon a top-level implementation of a set of common and agreed upon tests and scenarios, and have appropriate programs and data automatically generated, many of these previously described problems would be corrected. This would be particularly true in an organization where project-associated domains occur in widely disbursed geographic locations.

SUMMARY OF THE INVENTION

The present invention provides for universal serial bus traffic scenario auto-generation with customized targeting to user-specified tools and facilitates hardware, software, and test co-development for a USB smartcard device. It creates and manipulates test programs and data, which can be properly processed and rendered in a format suitable for each of the tools, in each domain, which are involved in the development, debug and validation of the final product.

A common "language," is found to express the list of desired cases and scenarios and is understood across all domains. It is used to implement a defined list. A framework is devised by which the described cases, use the common "language," and process the descriptions in an automated and repeatable fashion. The framework analyzes the descriptions and translates them into a format useable for each targeted development tool. This framework also analyzes captured data from various tools and performs a cross-domain characterization.

The framework is iterative in its nature and is capable of importing known-good capture data of contrived real-world cases and scenarios. It analyzes and produces functionally accurate models and uses a "language" of choice. This allows for a variety of flexibility in terms of starting points for test case development and debug.

The framework iterates upon a loop and accepts descriptions of "golden master" tests, cases and scenarios, expressed in a common "language" syntax. It generates suitable files for targeted tools in multiple domains. It also accepts cases and scenarios and is expressed in tool-specific descriptions and generates a "golden master" equivalent. It is possible to develop a defined test suite and leverage and share work from other sources or introduce related tests that are devised in one of the domains for special purposes into a master test suite. It is also possible to perform a validation of key portions of the workflow.

In some cases, tool-specific outport formats can be defined in templates and automated cross-correlation of results can occur across domains.

A system and method for testing the design of a universal serial bus (USB) smartcard includes a bus analyzer for running test cases to generate USB bus traffic relating to a smartcard device. A processor is operatively connected to the bus analyzer and receives and transforms data about USB traffic into a selected data format usable across different smartcard development environments.

In one aspect of the present invention, the system processor is operative for developing test cases for USB traffic patterns and recording USB traffic activity as USB traffic files that include details of USB bus traffic.

In another aspect of the present invention, a test socket can be operatively connected to the bus analyzer for receiving a silicon chip of a smartcard to be tested. A smartcard reader can also be operatively connected to the bus analyzer for receiving a smartcard device that will be tested. A smartcard emulator can also be operatively connected to the bus analyzer emulating a smartcard device. The processor preferably includes a computer having a graphical user interface through which the bus analyzer can be controlled.

The processor can also be operative for generating text-only USB traffic generation (UTG) files that describe USB traffic to be generated. The processor can also be operative for transforming the USB traffic files into received data files that reflect the data received by generated traffic on the USB bus and/or expected data files about expected data results. The processor can also be operative for comparing data and received data files with data in expected data files. The received data files and expected data files are text-only data files that can be easily compared and/or parsed for further information about bus traffic.

A method aspect of the invention is also disclosed and claimed.

BRIEF DESCRIPTION OF THE DRAWINGS

Other objects, features and advantages of the present invention will become apparent from the detailed description of the invention which follows, when considered in light of the accompanying drawings in which:

FIG. 1 is a flowchart illustrating the functional test flow in the system of the present invention.

FIG. 2 is a fragmentary diagram of the physical environment for functional testing in accordance with the present invention.

FIG. 5 is an example of a USB traffic generation (UTG) file containing only a host-side description of traffic, making it a UTG(H) file.

FIG. 7 is an example of a USB packet view format (PVF) file format derived from the originating UTG file example shown in FIG. 5.

FIG. 8 is an example of a generator traffic file format (GTFF) that is derived from the originating UTG(H) file shown in FIG. 5.

FIG. 12 is an example of a device expected data file (DEVEXP) content derived from an originating PVF file shown in FIG. 7.

DETAILED DESCRIPTION OF THE PREFERRED EMBODIMENTS

Figure 3:
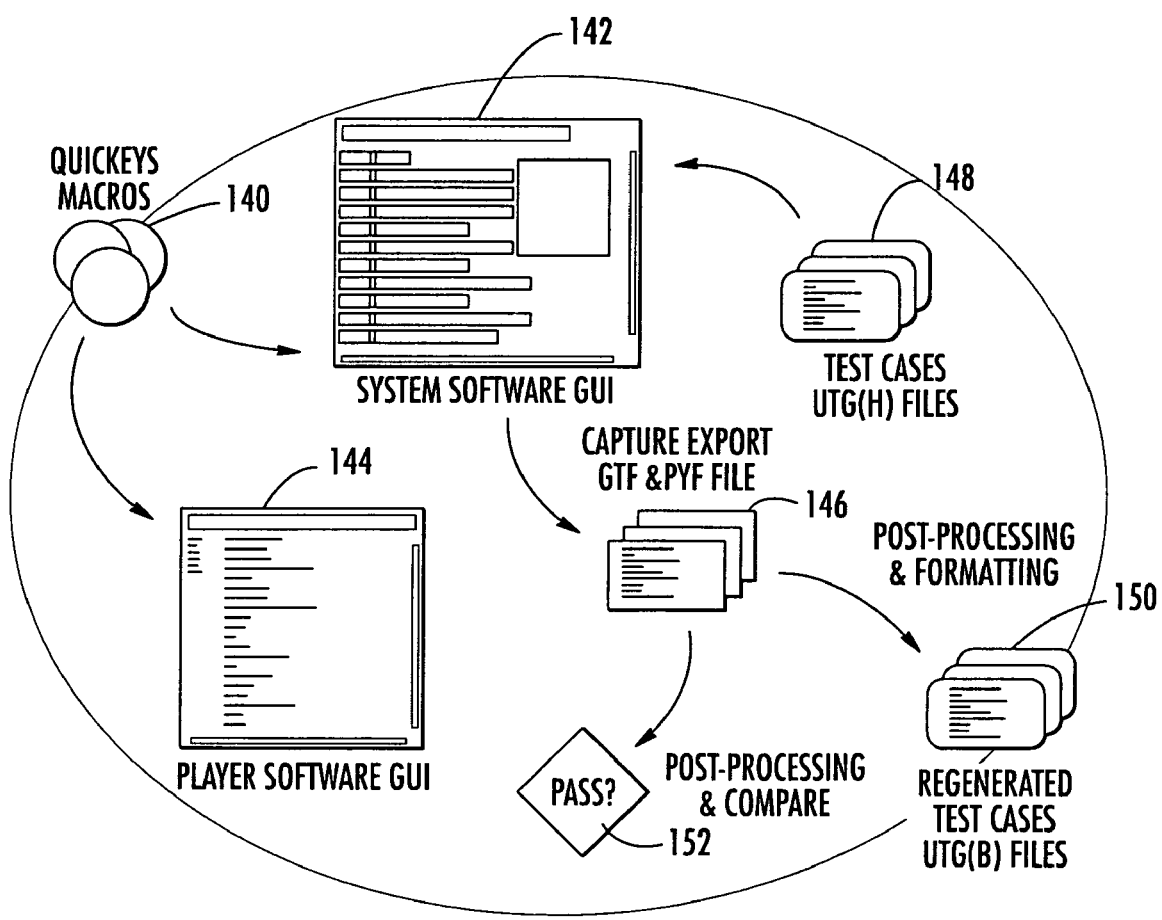
FIG. 3 is a fragmentary diagram showing high-level data flow in accordance with the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As noted before, the present invention provides for universal serial bus traffic scenario auto-generation with customized targeting to user-specified tools and facilitates hardware, software, and test co-development for a USB smartcard device. It creates and manipulates test programs and data, which can be properly processed and rendered in a format suitable for each of the tools, in each domain, which are involved in the development, debug and validation of the final product.

A common "language" is found to express the list of desired cases and scenarios and is understood across all domains. It is used to implement a defined list. A framework is devised by which the described cases, use the common "language," and process the descriptions in an automated and repeatable fashion. The framework analyzes the descriptions and translates them into a format useable for each targeted development tool. This framework also analyzes captured data from various tools and performs a cross-domain characterization.

The framework is iterative in its nature and is capable of importing known-good capture data of contrived real-world cases and scenarios. It analyzes and produces functionally accurate models and uses a "language" of choice. This allows for a variety of flexibility in terms of starting points for test case development and debug.

The framework iterates upon a loop and accepts descriptions of "golden master" tests, cases and scenarios, expressed in a common "language" syntax. It generates suitable files for targeted tools in multiple domains. It also accepts cases and scenarios and is expressed in tool-specific descriptions and generates a "golden master" equivalent. It is possible to develop a defined test suite and leverage and share work from other sources or introduce related tests that are devised in one of the domains for special purposes into a master test suite. It is also possible to perform a validation of key portions of the workflow.

In some cases, tool-specific output formats can be defined in templates and automated cross-correlation of results can occur across domains.

The functional test methodology for the system of the present invention is summarized in the high level flow chart of FIG. 1. A hardware emulator is initialized (block 100). An analyzer system generates specified USB traffic scenarios (acting as a USB host) and captures the entire traffic scenario (host and device responses) (block 102). The resulting capture data is then post-processed (block 104). The post-processing involves manipulation of data formats and extraction of key information. Finally, the extracted information is compared against what was expected and summarized (block 106).

FIG. 2 illustrates basic components and the physical environment of the system 110 used in the present invention. For purposes of development and validation of the system, several software and hardware components are combined, as illustrated.

The analyzer 112 used in the system can be a CATC™ USB Chief Bus and Protocol Analyzer, also referred to herein as a system analyzer. A personal computer 114 can include analyzer system software that is operable with the CATC USB Chief Bus and Protocol Analyzer. It also includes STPlayer software (player) from STMicroelectronics. The analyzer system software and player software are operable for workflow management. The analyzer 112 is operable with a smartcard 120 and reader 122, a dual-in-line (DIL) package and test socket 124, and a hardware emulator 126. The analyzer is operable with the PC to receive test cases as USB traffic generation files. The hardware emulator 126 operates with a suite of test cases 128. The test design and test cases are debugged and validated. The test cases are run against numerous samples of the silicon chip. The results from each test case are post-processed and results compared against "golden" results and summarized. The results from all test cases for a given device under test (DUT) are tallied to determine a final PASS or FAIL result 130. The steps can be repeated for each test case and for each device in the test that is tested.

The analyzer 112 can be used with many different applications that are windows-based, including a desk top PC in a USB development lab environment and a portable PC for field service and maintenance. It includes modular system architecture and field upgradable firmware. It includes reporting memory and channel aids and high impedance tap inserts. It can record triggering-bit-wise value and mask data patterns and can trigger a multiple error condition, such as PID bad, bit stuffing bad, CRC bad, end-of-packet bad, babble, loss of activity, frame length violation, time-out or turn-around violation, and data toggle violation. The analyzer can filter real-time traffic, detect and capture full-and-low speed traffic, and display potential bus errors, protocol violations, and combinations thereof.

The analyzer has high resolution, accurate time stamping of bus packets, and time measurement analysis functions. It can include a graphical display of bus packets, transactions and transfers to appropriate drivers, and blue tooth protocol extraction and decode. It can use a secondary recording channel with two USB branches, and display different levels of BUS traffic, such as set-up and IN or OUT transactions. Transactions can be combined into USB transfers and a user can view the control, bulk, interrupt or isochronous transfers. USB requests and descriptors can be decoded and large quantities of transaction data searched. A class/vendor/specific decoding allows designers an English language equivalent of data stream command structures. Digital data can be decoded and a command equivalent displayed. USB bus traffic, containing legal and illegal packets can be generated to allow stress/limit testing of devices. The system can detect and alert a user to bus errors, protocol violations and the different combinations.

The hardware emulator 126 can be an ST19Y hardware emulator. It should be understood that the present invention can use different emulation tool sets, for example, a Mentor Graphic Celaro Hardware Emulator that is rated for up to 500 MHz. A personal computer functioning at real-world speeds can also be used. Another tool set for emulation could include a customized stand-alone emulator with a modified design to accept a full speed USB device controller, and an analog transceiver.

With the hardware emulator, a virtual model of the system can be created inside the hardware emulator and operated in real time for seconds, minutes or longer as verification. The hardware emulator can use a multi-user project resource with millions of gate capacity and a fully automated flow for Register Transfer Logic (RTL) designs and memory interferencing for RTL memories. The system is operable with different clock domains, uses an expanded, on-board, dual port design memory of many megabytes with embedded multi-port memory.

A hardware emulator (HWE) can be used to validate the HDL design implementation as well as the functional test cases. When silicon is available, the basic methodology is repeated. It is possible, however, that the silicon can be used in place of the HWE. The chip is accessible in packages as follows:

1) A Dual-in-Line (DIL) package can be mounted inside a standard 24-pin (wide) DIL package. A small card containing a socket and a special USB type-A male connector can be used to interface the chip-under-test to the CATC hardware. Optionally, an LED may be added for visual feedback, and to verify proper functionality of the embedded USB traffic signaling logic. For example, commonly assigned and copending application Ser. Nos. 10/403,854 and 10/403,853, the disclosures which are hereby incorporated by reference in their entirety, disclose the use of LED's for signaling.

2) A smartcard package can be mounted inside a standard smartcard SIM module. This is mounted inside of smartcard package, recognizable by its characteristic credit card-sized form factor.

These options allow the system to derive substantially identical results between the HWE and the final silicon.

Various modes are used. For example, a "test mode" is the initial operational mode of the system following the silicon fabrication process. Specific functionality exists in the test mode that is particular to a silicon test and validation, as part of the initial fabrication process, and will not exist in any other mode.

An "issuer mode" is the operational mode of the system as delivered to a customer for personalization. The issuer mode has a particular functionality that allows the issuer to make certain customizations to the system before it is given to an end consumer, which will not exist in its final mode.

A "user mode" is a final, permanent, operational mode of the system following customization by the issuer.

From a high-level perspective, the functional test flow is straightforward, as illustrated in the diagram of FIG. 3. As illustrated, QuickKey™ macros 140 are operative with the software graphical user interfaces, such as the analyzer 112 software GUT 142 and the player software GUT 144. QuickKey™ is a software product manufactured and sold by CESoft, Inc. (www.cesoft.com), which allows a user to mimic human interaction with a PC, for example, click buttons, select windows, menus, etc. A set of operative sequences can be defined using QuickKey™ syntax, and replayed. This program is useful for accurately, reliably and repeatedly mimicking human interaction with a GUT interface.

Export generator text format (GTF) and packet view format (PVF) files are part of captive/export files 146. Various test cases 148 as USB traffic generation (UTG) files can be imported. From the capture and exported GTF and PVF files, there is a post-processing formatting for regenerated test cases of UTG(B) files 150 and post-processing and comparison for pass or fail analysis 152. A set of functional test cases is used to exercise a device-under-test, and the resulting data is processed and weighed against pre-established criteria.

Each test case, which describes a desired traffic scenario, must be interpreted by the analyzer 112, which generates specified host-side patterns. Responses from a targeted device-under-test (DUT), along with the host-side signaling, is recorded. This data is later exported and post-processed. Finally, the resulting post-processed "received" data is compared against the "golden" expected data.

Basic steps are identified to produce a final result for a given DUT for which numerous test cases are exercised. There are some implications of using a hardware emulator versus final silicon. The steps required to produce any "golden," expected but final compare data are evaluated and common steps are identified. These common steps in the workflow form the framework of a required process management.

The basic actions required to navigate and manipulate the GUI's of the software traffic generation, capture, etc. and any player package for HWE initialization can be controlled. A large amount of direct control over a mouse cursor of the GUT is required. Control key sequences are for some, but not all, of the required actions.

Figure 4:
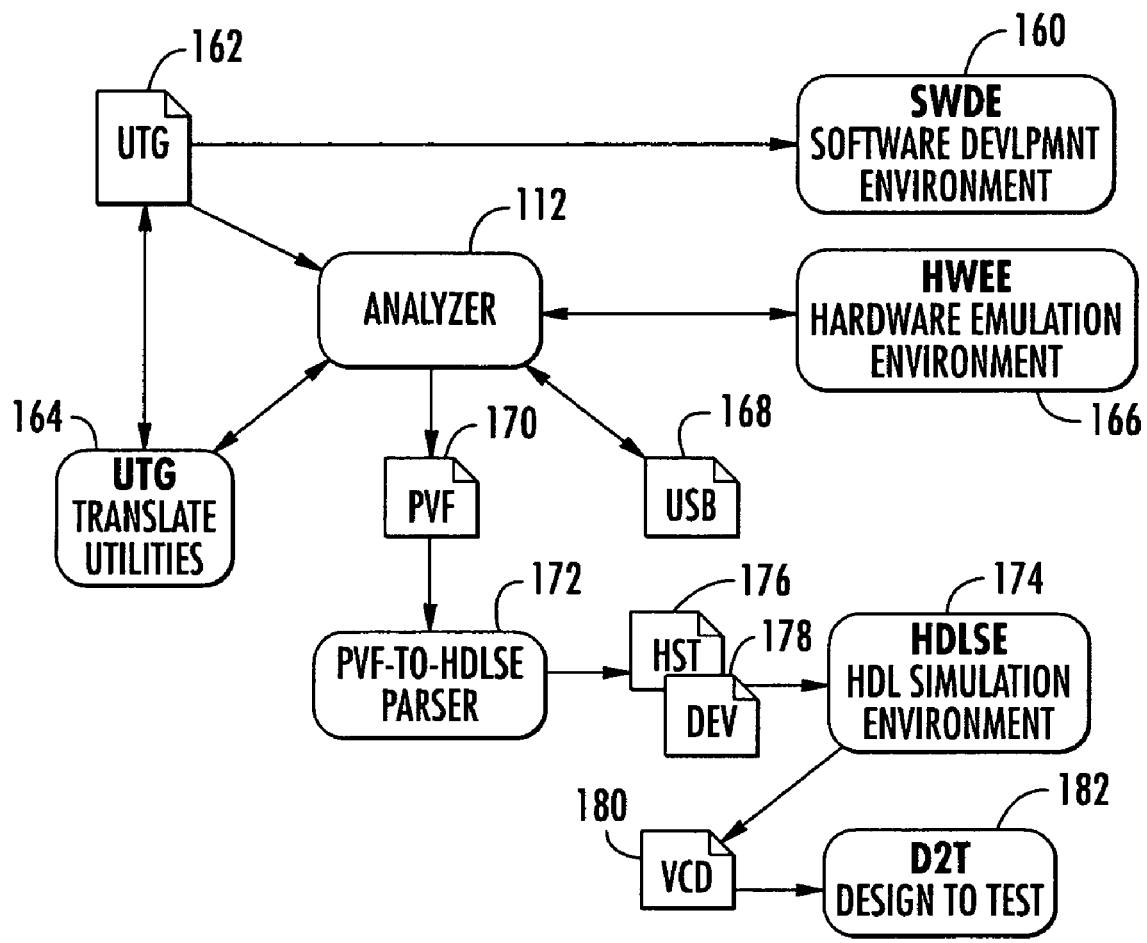
FIG. 4 is a block diagram showing various test vectors used in the development flows.

It is possible to develop a suite of test cases which are used in several different development environments for the system, as illustrated in FIG. 4.

The test factors used in the development flows are in FIG. 4 with the software development environment (SWDE) 160 operative with the USB traffic generation (UTB files 162 and USB traffic generation translation utilities 164, which in turn, are operative with the analyzer 112. This is operative with the hardware emulation environment (HWEE) 166. The analyzer is operative with the universal serial bus (USB) files 168 and packet view format (PVF) files 170, which are operative with the PVF-to-HDLSE parser 172 and the HDL simulation environment 174 through the host (HST) 176 and device (DEV) 178. The HDL simulation environment 174 is operative with the VCD 180 for designed-to-test 182.

A common set of test cases are devised using a well-understood syntax in textual format. The syntax used by the USB system proves to be versatile and includes support for signaling and protocol errors. Additionally, the analyzer can compute check sums, bit and frame timing, and include the expected default signaling patterns.

Once a consistent set of cases is created, it becomes possible to develop tools to allow transformation of the original traffic scenario descriptions into formats usable in the different development environments. The "Hardware Emulation Environment," is shown by non-shaded portions and blocks of FIG. 4. This environment includes the hardware emulator 126 and the software and hardware analyzer 112 shown in FIG. 2. The UTG files 162 of the test cases could be used directly. One constraint is the analyzer should generate bus traffic, and the UTG files must be structured such that only the host-side of the scenario will be interpreted.

It is possible to describe a complete traffic scenario that includes both host-side and device-side activity in a UTG file. This type of traffic description file is referred to as a UTG(B) file, where the (B) indicates that the active description contains both the host-side of the traffic, and the device-side of the traffic. A traffic scenario can also be described as host-side only for traffic generation purposes. This type of UTG file is referred to as a UTG(H) file, the (H) indicating "host-only."

By using a portion of the workflow, in conjunction with appropriate translation utilities and consistent file structure, it is possible to convert a UTG(B) file into a UTG(H) file or vice-versa. This is possible by using consistent file formatting. A workflow interpreter could ignore everything following a ";" (semi-colon) on a line in a UTG file. Using this comment character to effectively "enable" or "disable" portions of the system USB traffic description syntax, any filters look for special "tags" within the commented text of the file.

When used for traffic generation (UTG(H) file), a special tag <W> could indicate "wait for x bytes" of protocol timing to elapse before proceeding. When used for UTG file interpretation (UTG(B) file), a special tag <D> could indicate "device response expected." Either the <D> or the <W> tagged lines could be "enabled" at any given time, but never both at the same time.

In general, each test case represents a particular USB traffic scenario, in which particular behavior and functionality is exercised and evaluated. The traffic scenarios are described using a special set of syntax, understood by the analyzer software, and are referred to as the USB traffic generation (UTG) files.

Because UTG files are text-only, they are easily created and modified with any text editor and immediately used. The analyzer software and hardware produces the described host-side bus traffic. Timing allowances are specified where device-side responses are anticipated. An example UTG file is shown in FIG. 5. This example is a host-side description of traffic, making it a UTG(H) file.

When a test case is "run," traffic capture is enabled, traffic generation is initiated, and the resulting activity on the USB is recorded. This recorded activity is saved to a binary formatted Universal Serial Bus (USB) file. Later, the USB file can be read, revealing the captured traffic, consisting of both the original host side activity (described in the UTG file) and the device-side responses, complete with relative timing information.

The traffic scenario contained within a USB file can be exported into two formats: (1) Packet View Format (PVF) and Generator Text File Format (GTFF). These ASCII text files contain a description, in two different formats, of the traffic scenario, which can then be parsed, the relevant information extracted, and the data analyzed and manipulated.

Figure 6:
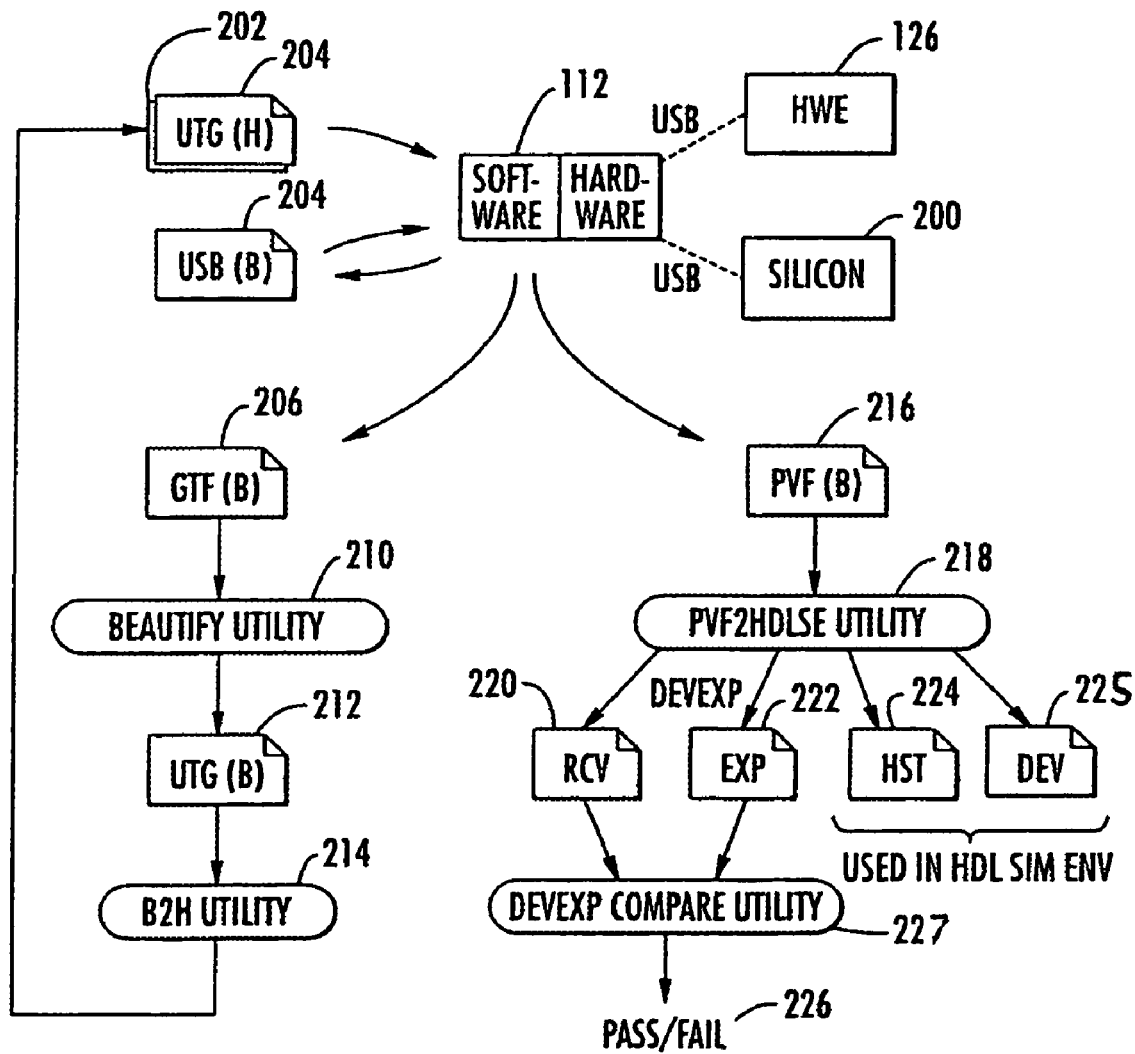
FIG. 6 is a block diagram showing the test data flow overview.

FIG. 6 shows a test data flow overview with the analyzer 112 operative with the hardware emulator 126 and the silicon 200 via the USB hardware connection. The analyzer is operative with the USB traffic generation files 202 (host only) and USB files 204 (host and device). It is also operative with the generator text format (GTF) 206 (host and device) files, which in turn, are operative with a system "beautify" utility 210 and the UTG(B) files 212. The B2H utility 214 loops back to the UTG(H) 202. The B2H utility is operative for information extraction of B and H files. The analyzer is also operative with the PVF(B) files 216, which in turn, are operative with the PVF-to-HDLSE utility 218 for the received data file (RCV) 220, the expected data file (EXP) 222, and the USB host 224 and device 225 used in the HDL simulation environment. The RCV 220 and EXP 222 are operative with the DEVEXP comparison utility 227 for pass/fail analysis 226.

The PVF file 216 is used to generate the "device expected" data file (EXP) 222 via the utility 218. This file format is referred to as DEVEXP, and when using the "golden" USB capture file as the source, the data in these files is later used as the "golden compare" data. Similarly, when the traffic scenario cases are run against the HWE 126 or a DUT, the DEVEXP-format "device received" data file (RCV) 220 originates from the PVF export file.

For each test case, the resulting device RCV file 220 is compared against the corresponding EXP file 222 for any differences. The emphasis of the comparison is on the content of the actual responses, and their relative placement, from the device-under-test, rather than the specific time in which the responses were received. An example PVF file is shown in FIG. 7.

The USB traffic scenarios in the suite of USB functional test vectors for the USB device are described in the UTG files using a system syntax. The files are read by the system and used to generate the described traffic. Simultaneously, the system will monitor and capture the resulting bus activity. This data can be exported into the PVF file format that is used by the PVF-to-HDLSE parser 172 shown in FIG. 4. The USB packet view format (PVF) file format is derived from the originating UTG file shown in FIG. 5.

As shown in FIG. 6, the GTFF (a/k/a GTF) file 206 may be used to reconstitute a UTG file. For this to work properly, it is essential that the originating USB file contain both the host and device portions of a USB traffic scenario. This path in the workflow is useful for instances where a traffic scenario was captured for which there was no original host-only UTG(H) file. The system is used only to capture the activity on a USE, but is not involved in generating any of the traffic that is recorded. This path is also useful for instances where only a UTG(H) stimulus file and the resulting capture USB files are available, but the device-side responses are needed.

For example, to generate the "expected" (EXP) files (DEVEXP format) for a test case, only a UTG file and a resulting capture USB file are provided. In this instance, the original UTG traffic scenario stimulus file contained only the host-side activity, i.e., a UTG(H) file. Thus, when an original UTG file is passed through the h2b filter utility, the complete scenario is not revealed (as would be seen in a UTG(B) scenario file), so the device portion cannot be extracted.

The USB file, however, could be exported to GTF, parsed and analyzed, and a new UTG(B) file generated. This new UTG(B) file could then be passed through the B2H filter utility 214, producing a new UTG(H) file. The "original" UTG(H) file and the corresponding "new" UTG(H) file should be substantially identical in function. The side-effect is the extraction of the device responses, which are used to produce a DEVEXP formatted file. Performing this post-processing on a "golden" capture file, the EXP compare files can be generated. Later, RCV files are generated the same way, and are compared to the earlier EXP files.

An example GTF file is shown in FIG. 8. The USB traffic scenarios in the suite of USB functional test vectors for the USB device are described in the UTG files using the system syntax. The files are read by the system and used to generate the described traffic. Simultaneously, the system monitors and captures the resulting bus activity that can be exported into the GTF file format that is used by the beautify utility 210. The generator traffic file (GTF) format file is derived from the UTG(H) file shown in FIG. 5.

For purposes of development and validation for the system, several software and hardware components are combined, as illustrated in FIG. 1 and described before. In this environment, several hardware configurations are possible, and, depending on the hardware configuration chosen, one of several software configurations is used.

An example of the primary software components that can be used for the workflow of the present invention are summarized in Table 1 below:

TABLE 1

Software Components of Workflow

| Software Components | Purpose |
|---|---|
| Test Cases Suite | Functional validation of DUT |
| USB Software for Analyzer | Read/write UTG/PVF/GTF files, control Analyzer |
| Player Software | Software package to support the Hardware Emulator |
| QuicKeys macros for Workflow | GUI manipulation tasks for Analyzer Software/Hardware and Player |
| CE Software QuicKeys | GUI automation macro software package |
| Workflow Control Scripts | A set of Perl-based scripts that manage the workflow |
| Perl 5.6.x Interpreter | Perl scripting language interpreter (with standard modules) |

An example of the primary hardware components that can be used for the workflow of the present invention are summarized in Table 2 below:

TABLE 2

Hardware Components of Workflow

| Hardware Components | Purpose |
|---|---|
| Host PC (Windows 98 or 2000) | Run system and analyzer software, Player software, Perl interpreter, QuicKeys macros, Workflow automation environment |
| Analyzer | USB traffic generation, USB traffic capture |
| Hardware Emulator | Real-time emulation; host to HWE Daughter Card |
| HWE Daughter Card | Hardware-accelerated design implementation and firmware validation. The HWE daughter card attaches to AUX connectors and provides functional personality of the IC (final product) being developed and tested. |
| Smartcard and Card Reader | Test design in smartcard packaging with low-cost USB card reader |
| DIL package and Test Socket | Silicon embedded in nDIL packaging |

A set of test cases can be developed, which are intended to exercise various features and functionality of the targeted product design. The syntax used by the system can also describe captured bus traffic and be in a format for exporting data. Intermediate formats for these test cases and their results can be interpreted and manipulated by script utilities in the workflow to transform the data into various formats.

A hardware emulator could also be developed prior to the final product production. This facilitates validation of at-speed functionality, and co-development of the hardware, application software, and embedded firmware.

At the system level, a USB Device Core (UDC) can be integrated into a Custom Logic Block (CLB) and mated with a secure embedded microprocessor. A portion of this mixed-HDL design can be implemented into a Field Programmable Gate Array (FPGA) device on a daughter card, such as the HWE daughter card, as an extension of a baseline hardware emulator for the target microprocessor. The system is capable of operating "at-speed" with respect to the functionality of the final product.

To debug and validate the hardware design (and embedded firmware), the hardware emulator 126 is mated with the analyzer 112 (FIG. 2). Configuration of the hardware emulator is performed from the host PC 114, using the system software and API.

Some silicon samples can be packaged in DIL (Dual In-Line) packages 124 to facilitate debug and analysis. A small test socket card can be built with a socket to receive a 24-pin DIL package, and an optional LED for visual feedback. A USB type-A connector can be used to mate this assembly to the analyzer 112 using a primary USB socket.

A USB connector can be used on the test socket. This connector can be slightly different from the standard USB type-A plug. The internal contacts that mate with the USB type-A receptacle can be slightly skewed in length to guaranty that power and ground are connected before the DP and DM pins when the plug is inserted into the socket. This action would guaranty the proper Power-on-Reset (POR) sequence for the device. This connector can also be used with a low-cost USB smartcard reader, and with a "dongle"-style package.

Some silicon can also be packaged in a SIM format. The SIM can be integrated into a credit card-sized "Smartcard" package. This allows the device to be used in a smartcard reader. A low-cost USB card reader can include an enclosure, an internal connector to make contact with the card as it is inserted, and a USB cable with a USB type-A plug. A USB cable can connect the reader to the analyzer or directly to a PC's USB bus, in a final deployment. There are several types of card readers that can be used in the present invention. These are summarized in Table 3.

TABLE 3

Types of Card Readers

| Card Reader Type | Description |
|---|---|
| ISO Card Reader | Commonly found in European ATM machines and authentication applications. Reads inserted smartcard using the ISO7816 serial protocol. |
| USE Card Reader | Commonly found in desktop authentication applications. Reads inserted smartcard using the ISO7816 serial protocol, but is connected to a computer using full-speed USB protocol. |
| Low-Cost USB Card Reader | Specific to the USB device, consisting essentially of a USB type-A connector on one end of a cable, and a simple smartcard connector on the other, which is housed in the reader enclosure. Commonly found in desktop authentication applications. Reads inserted smartcard using low-speed USB protocol. |

The analyzer 112 is used for several purposes:
1) Generate USB bus traffic;
2) Monitor and capture USB bus traffic;
3) Analyze USB(B) files (no traffic generation);

4) Post-analysis of traffic capture files; and

5) Debug and development of the functional test cases.

Generation of bus traffic first involves the creation of the text-only UTG (USB Traffic Generation) files. The UTG files are read by the analyzer software running on the host PC 114, and the information is downloaded to the analyzer 112. The analyzer generates the described traffic patterns onto the USB bus connected to its primary USB port.

For monitoring and capture of USB bus traffic, the analyzer 112 taps into the USB at the point of interest, monitors the bus activity, and uploads captured data to the analyzer software running on the host PC 114. From this point, the captured scenario is saved to one of several data formats, and post-processed as needed.

The USB-equipped PC is used for the following tasks:

1) Host the system workflow scripting environment;

2) Run and control the analyzer system software and hardware; and

3) Run and control the hardware emulator software and player software.

The PC may run different Windows operating systems and is populated with the required software and test cases.

The automated workflow management of the present invention, in one non-limiting example, also includes two other components:

1) Perl scripts for workflow control and file management; and

2) QuicKeys macros for GUI manipulation.

The workflow is capable of controlling the GUI-based analyzer system software and hardware emulator software. An open-source Perl interpreter package is used to run the Perl scripts, and a copy of a commercial version of QuicKeys for Windows, can be installed on the host PC for GUI manipulation tasks.

Depending on what is provided, it may be necessary to derive a final "golden" comparison data and a "complete" UTG file. These processes have a common origin and similar top-level handling, as illustrated in the flowchart for the DEVEXP and reconstitution shown in FIG. 9.

Figure 9:
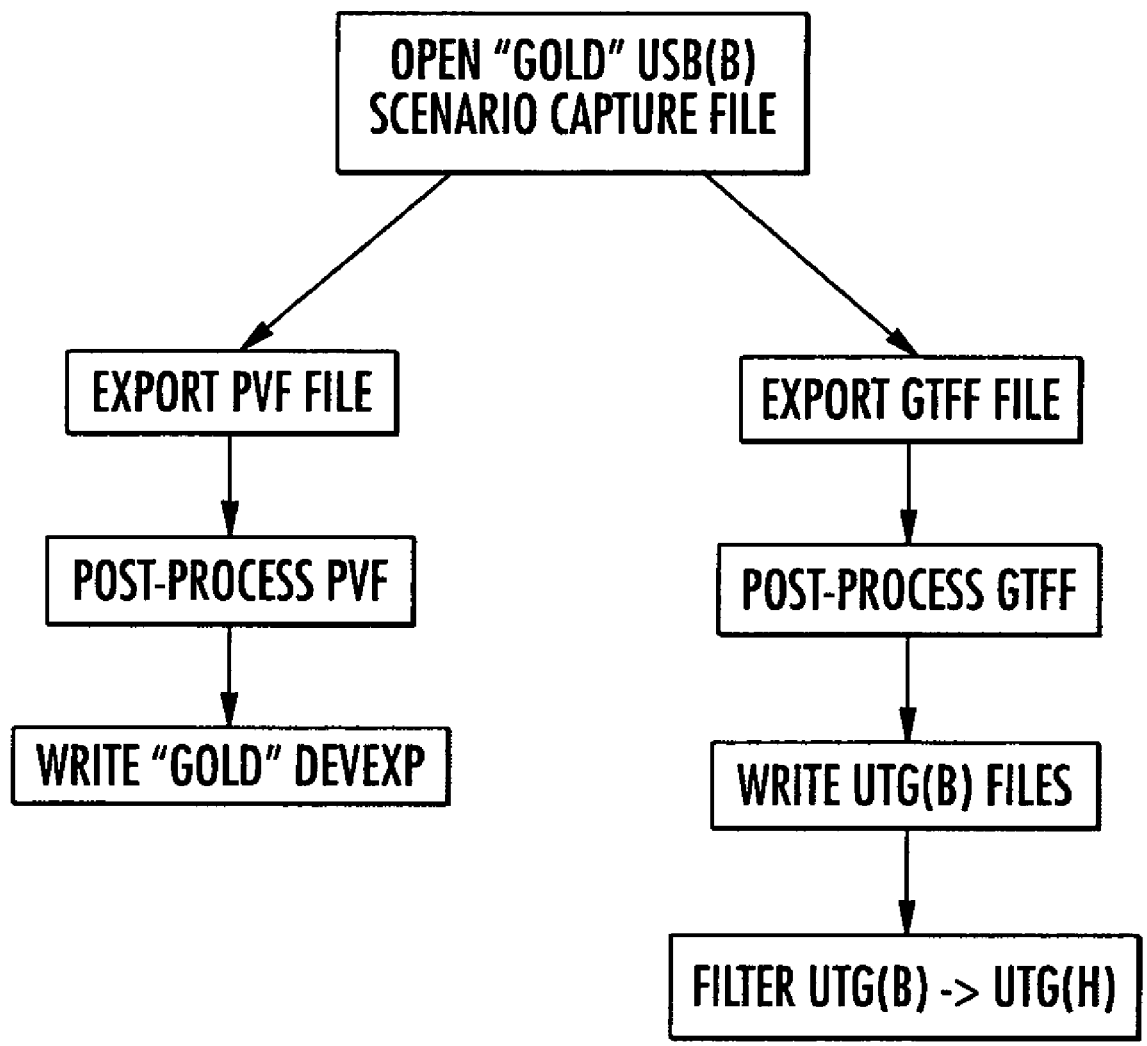
FIG. 9 is a flowchart illustrating the DEVEXP and UTG reconstitution.

Processing to generate the DEVEXP files and the (regenerated) UTG files begins by exporting the data contained in a system binary-formatted USB file, followed by appropriate post-processing. As shown in FIG. 9, the Device Expected (DEVEXP) file is derived from an exported Packet View Format (PVF) file. This methodology is followed for both the device "expected" data and the device "received" data. The basic flow for this process is shown on the left-hand side of FIG. 9 and in FIG. 10.

In this portion of the workflow, processing begins with a binary format USB file. This file is expected to contain a complete description of the traffic scenario of interest. The description of the traffic contains both the host-side and the device-side of the traffic content. This is not always the case, however.

A system USB file typically has one of three main origins:

1) Capture of the traffic observed when the system hardware generates traffic (as would be described in a UTG(H) file) and the corresponding DUT responses (if any);

2) Saved analysis of a complete traffic scenario described by a UTG file which contained both the Host-side and the Device-side portions of the traffic content; and 3) Capture of traffic observed on a USB.

In example 3 above, the "complete" UTG file is referred to as a UTG(B) (where B means "Both Host and Device") file, and does not require use of the system hardware to generate the required DEVEXP (and other resulting files) "expected" files. Instead, the description of desired traffic scenario is complete, avoiding the need to generate traffic (with the system hardware) and record the resulting activity, i.e., interaction with the HWE.

Figure 11:
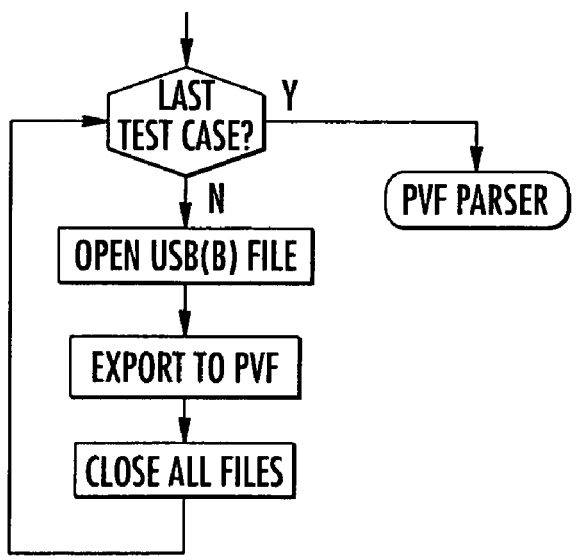
FIG. 11 is a flowchart illustrating an export PVF file.

The USB file, regardless of its origins and under the assumption that it contains a complete description of the host-device traffic, is exported to a Packet View Format (PVF) file as shown by the flowchart in FIG. 11. This file is text-only, and contains a packet-based description of the traffic patterns.

Figure 10:
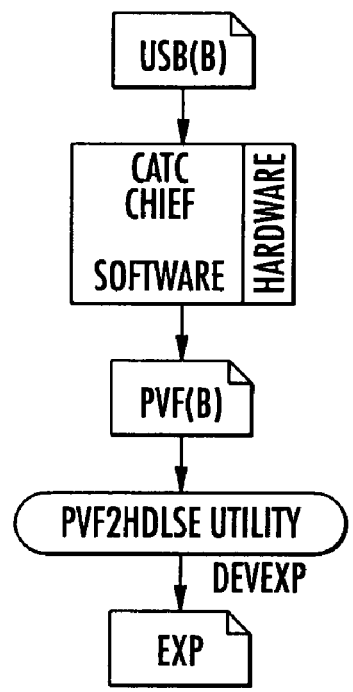
FIG. 10 is an example of a DEVEXP file generation.

The Perl-based PVF-to-HDLSE utility as shown in FIG. 10 reads the PVF file, normalizes the descriptive content, and parses that content, looking for clues regarding the control and data flow. Once the content is analyzed, several data files are written (HST, DEV and DEVEXP), for use by downstream tools. The HST (Host) and DEV (Device) files are used by the HDL Simulation Environment (HDLSE), and are ignored in this particular Workflow.

The DEVEXP file format is straight forward, and contains information for each expected Device response. The responses (and their corresponding contextual information) are written to separate lines in the file. The file format can be simple:

1) The file is ASCII text-only;

2) Non-compare information (i.e.: comments, etc.) is on separate lines which start with a "#" character, and are ignored by the DEVEXP Compare utility; and 3) Data lines in the file start with a keyword denoting the nature of the expected response, followed by contextual information, and payload data (if applicable), in a tab-delimited format:

keyword<T>request_name<T>packet_number<T>data_payload<T>comment_str

The "expected" data files for the test case suite are derived from the provided set of USB capture files. This processing is required because it is not possible to extract the device "expected" responses from the original UTG files, which contain system syntax descriptions of only the host-side of the traffic scenarios. When UTG(H) are used to generate traffic with a validated device model, however, the resulting captures are complete and accurate. An example of a DEVEXP file format is shown in FIG. 12. The PVF-to-HDLSE parser utility program reads the packet view format (PVF) file and analyzes the content. The parser writes three output files, one as a device expected data file (DEVEXP) compare data file. The device expected data file (DEVEXP) content is derived from the originating PVF file.

Figure 13:
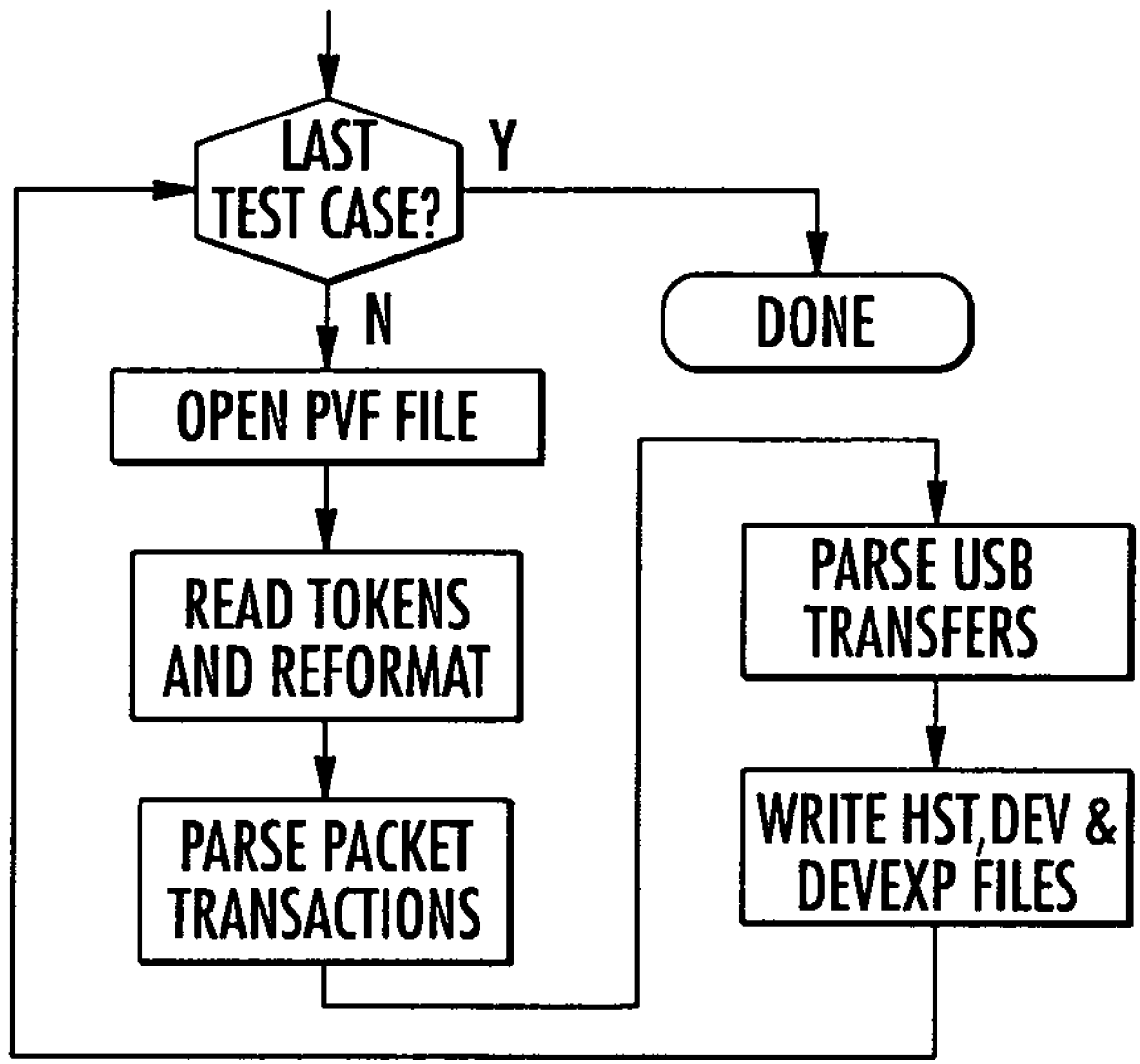
FIG. 13 is a flowchart illustrating the post-process PVF and generate DEVEXP file process.

FIG. 13 illustrates the process for a post-process PVF and generate DEVEXP file generation. Using the same methodology, the device "received" data is extracted from a capture USB file corresponding to the traffic scenario between the host (system hardware generating host-side of traffic scenario), and either the hardware emulator or the silicon product.

Figure 14:
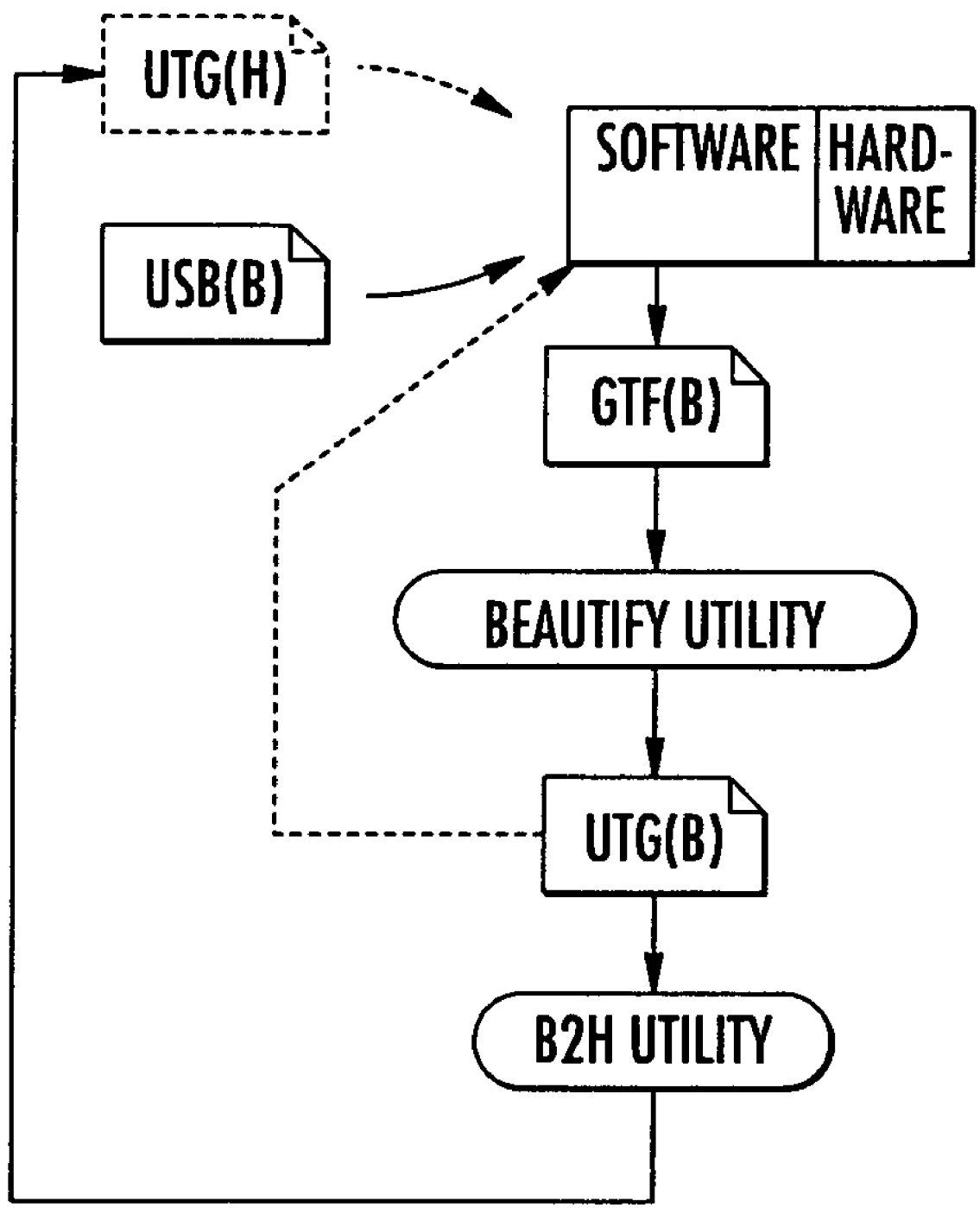
FIG. 14 is a flowchart illustrating the UTG regeneration.

In this portion of the workflow, it is possible to reconstitute a "complete" UTG file by analyzing what has been exported from the system software. The steps for regeneration of a UTG file are illustrated in FIG. 14. There are two main reasons why this portion of flow is used:

1) A UTG file contains a description of only the host-side portion of the USB traffic scenario (which is suitable for direct interpretation by the system bus traffic generator), and the device-side is needed as well.

2) When a USB traffic scenario was captured, and no UTG description existed prior to the capture. For example, a specific configuration using a USB "gold tree" with various cascaded hubs and peripherals can be contrived, and the traffic between the Host USB controller and a particular device can be captured.

As with the DEVEXP file generation described above, at this portion of the workflow, processing begins with a binary format USB file. This file is expected to contain a complete (host+device) description of the traffic scenario of interest. The USB file is exported to a Generator Text File Format (GTFF, GTF) file. As with the PVF export file, this file is also text-only, and contains a token-based description of the traffic patterns.

The Perl-based utility reads the GTF file, normalizes the descriptive content, and parses that content, looking for clues regarding the control and data flow. Once the content is analyzed, a well-formatted UTG file is written out.

This UTG file will contain both the Host-side and the Device-side portions of the traffic description, making it a UTG(B) file, that was contained in the originating USB file.

Figure 15:
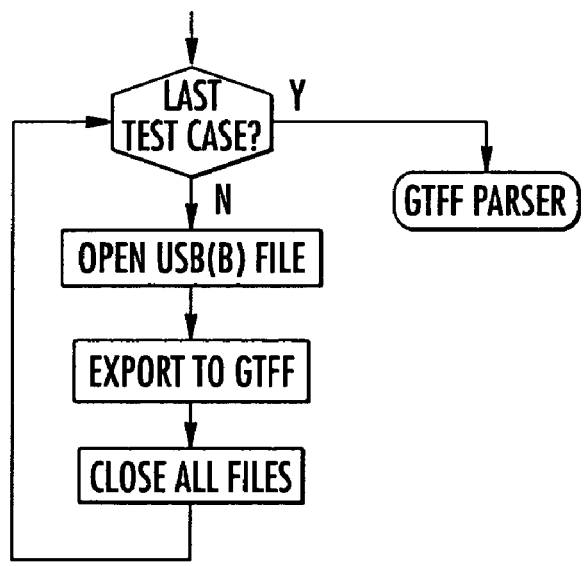
FIG. 15 is a flowchart illustrating the export GTF file.
Figure 16:
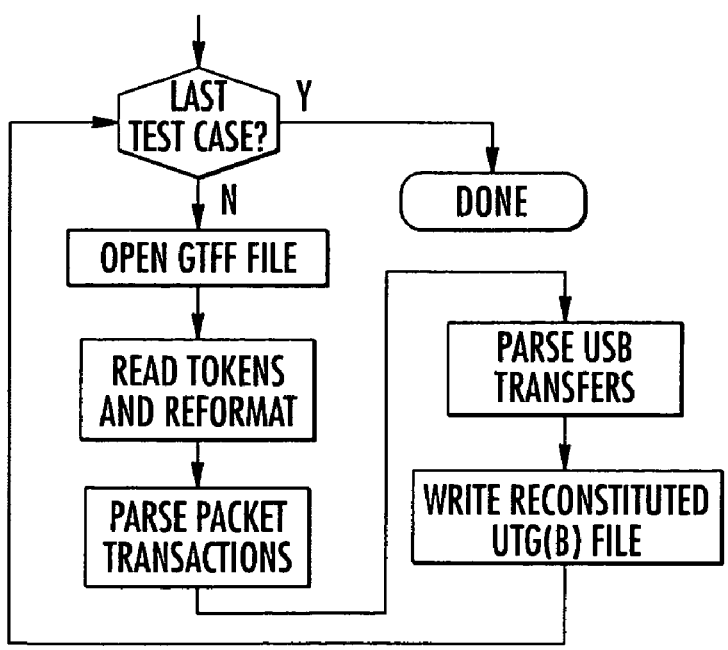
FIG. 16 is a flowchart illustrating the post-process GTF and generate UTG(B) file.

FIG. 15 shows the process for the exporting to the GTF file and FIG. 16 shows the flow process for the post-processing of the GTF file and generation of a reconstituted UTG(B) file.

By default, this UTG(B) file has all of the descriptive syntax enabled. In order to use this UTG file for traffic generation, it is necessary to filter it with a b-to-h utility as shown in FIG. 14, producing a functional UTG(H) file, but which still contains a faithful representation of the entire traffic.

Because of the nature of the newly-synthesized UTG file formatting, it is possible to filter it successively without loss of the complete traffic description:

UTG(B)->b2h filter utility->UTG(H)->h2b filter utility->UTG(B)

It is also possible to perform several cross-checks of the methodology, the tools involved, and the data flow. This is useful to ensure that the methodology and tools have not introduced or removed any functionality from the original test cases. The cross-checking can be performed in several ways, as described in the following sections, and referring to FIG. 17.

Figure 17:
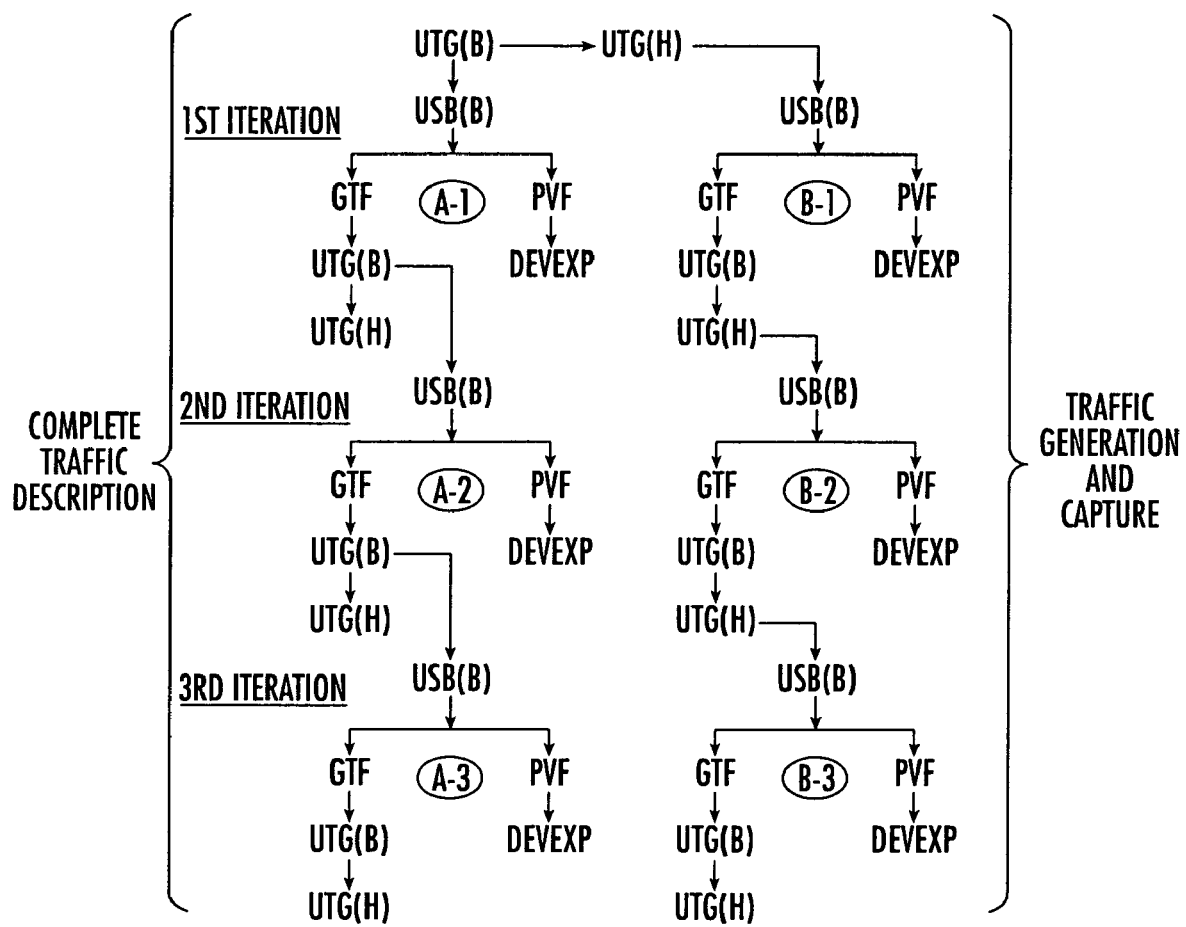
FIG. 17 is a diagram illustrating the iterative re-synthesis and testing for a complete traffic description and traffic generation encapsure.

This method is illustrated in FIG. 14 and in more detail on the right-hand side of FIG. 17. The method starts with a USB file of some origin, which is presumed to contain both Host-side and Device-side traffic. A UTG(B) file is reconstituted from this USB file (by exporting a GTF file), reflecting the (complete) original traffic. By filtering the new UTG(B) file to a UTG(H) file, the system can exercise the hardware emulation (HWE) or silicon, and perform a capture of the resulting traffic. The newly captured traffic is saved to a USB file and the process is repeated to regenerate a new UTG(B) file, then a new UTG(H) file. Traffic generation using this newest UTG(H) file exercises the HWE or silicon, and the resulting traffic is captured. This can be performed several times, successively, as illustrated in FIG. 17 and should produce the same results each time.

It is also possible to have multiple iterations using complete traffic descriptions. For example, this method is similar to the method described before. The primary difference between this method and the previous, is that no traffic generation is conducted. This method is illustrated in FIG. 14, and in more detail on the left-hand side of FIG. 17. This method starts with a UTG(B) file, where both the host-side and the device-side portions of the traffic scenario are present and active in the UTG file. This UTG(B) file is read by the system tools, and is interpreted. During this process, any missing details in the description are automatically computed. Any non-default behaviors of the described traffic pattern must be included in the originating UTG(B) file.

This interpreted and analyzed traffic scenario is saved to a binary USB file format. The USB file will now contain the default and computed information, such as CRCs, checksums, bit and frame timing and other information that is required by the workflow methodology beyond this stage. A new UTG(B) file is reconstituted from this USB file (by exporting a GTF file), reflecting the now completely described traffic scenario. At this stage, the system could filter the new UTG(B) file to a UTG(H) file, and proceed to exercise the HWE or silicon.

The newly-reconstituted UTG(B) file can be read back into the system, be interpreted and then analyzed, and the results saved to a new USB file. The process can be repeated to re-generate another new UTG(B) file and be performed several times, successively, as illustrated in FIG. 17. The process should produce the same results each time. This method can be initiated at any point in the method where a UTG(B) is available.

The files generated as a result of the successive iterations undertaken by these methods can be compared for differences. Theoretically, because of the nature in which the UTG(B) file is reconstituted from the originating USB file, successive generation of this file should produce the exact same content, from a functional standpoint. Minor differences would exist as a means to distinguish successive generations, such as file naming and references in the non-functional self-documentation. Therefore, it is possible to perform a comparison for differences in the original UTG(H) or UTG(B) "golden" files against reconstituted UTG(H) or UTG(B) files, such as from iteration at points A-2 or B-3 in FIG. 17.

In addition, these comparisons can also be taken between the UTG(H) or UTG(B) files from different iterations, for example, between points A-1 and A-3, or between B-1 and B-3, as shown in FIG. 17. This same method also applies to the derived DEVEXP files, which are synthesized as part of the process.

It is also possible to compare the results between both versions of the flow. A "complete" UTG(B) is used and filtered into a UTG(H) for the "traffic generation and capture" path file. Comparisons can be made between the UTG(H) or UTG(B) (and DEVEXP) files from different iterations, for example, between points B-3 and A-2, as noted in FIG. 17.

Figure 18:
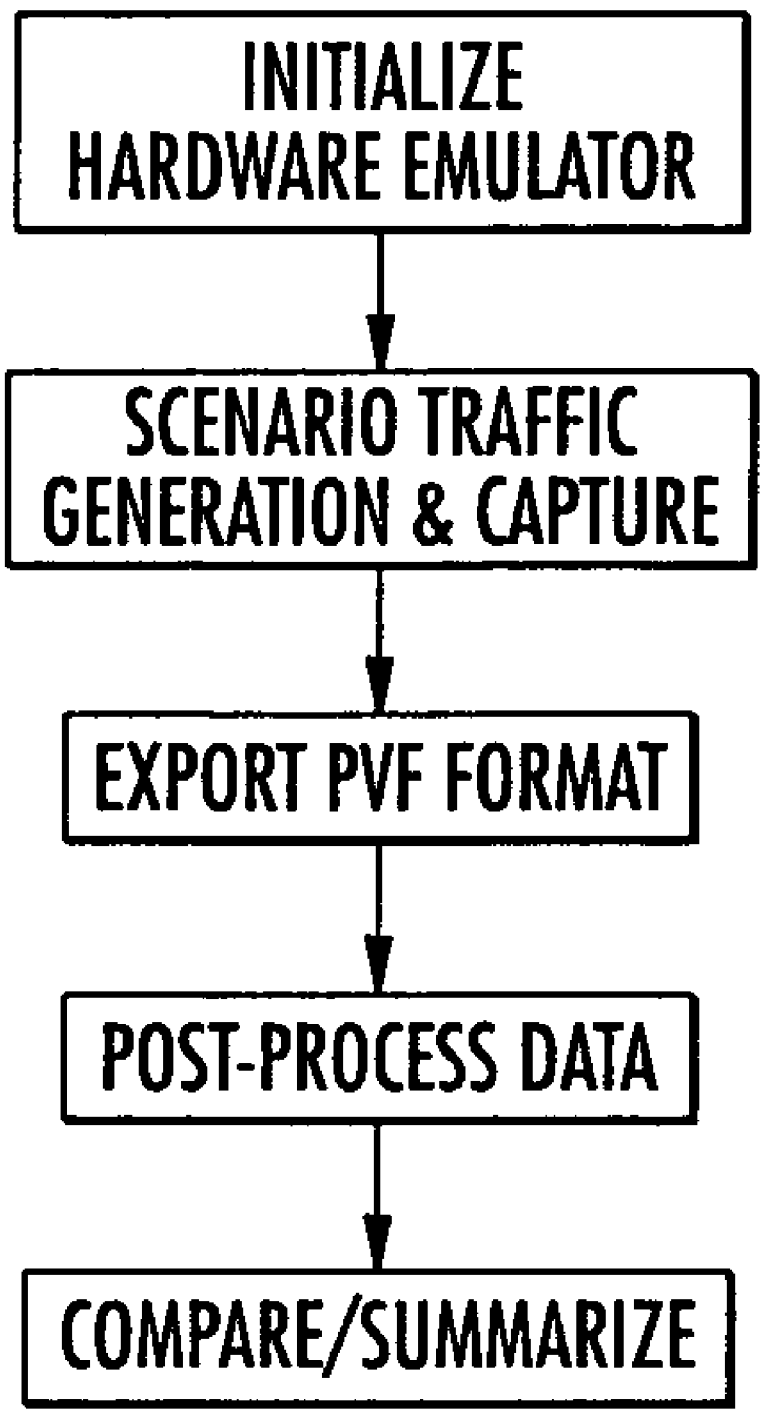
FIG. 18 is a flowchart illustrating the key steps of the HWE/test case validation.

It is possible to use a simple batch-style method for managing the various files and data. For example, a CLI (Command Line Interface) entry point can be used. It could be later enhanced with a graphical interface of its own for ease of use, but the CLI approach made it possible to initiate any one of many variations of the workflow simply by invoking the proper script. Such a script would contain predefined attributes that control the run time behavior, making it possible to invoke a complex sequence with a minimal amount of command line input. Key steps in a HWE/test case validation are shown in FIG. 18.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

The invention claimed is:

1. A system for testing the design of a Universal Serial Bus (USB) smartcard device comprising:
   a bus analyzer for running test cases to generate USB bus traffic; and
   a processor operatively connected to the bus analyzer for receiving and transforming data about USB traffic into a selected data format usable across different smartcard development environments.

2. The system according to claim 1, wherein said processor is operative for developing test cases for USB traffic patterns.

3. The system according to claim 1, wherein said processor is operative for recording USB traffic activity as USB traffic files that include details of USB bus traffic.

4. The system according to claim 1, and further comprising a test socket operatively connected to said bus analyzer for receiving a silicon chip of a smartcard to be tested.

5. The system according to claim 1, and further comprising a smartcard reader operatively connected to said bus analyzer for receiving a smartcard device that will be tested.

6. The system according to claim 1, and further comprising a smartcard device emulator operatively connected to said bus analyzer for emulating a smartcard device.

7. The system according to claim 1, wherein said processor comprises a computer having a graphical user interface through which the bus analyzer can be controlled.

8. The system according to claim 1, wherein said processor is operative for generating text-only USB traffic generation (UTG) files that describe USB traffic to be generated.

9. The system according to claim 1, wherein said processor is operative for transforming the USB traffic files into received data files that reflect at least one of the data received about generated traffic on the USB bus and expected data files about expected data results.

10. The system according to claim 9, and wherein said processor is operative for comparing data in received data files with data in expected data files.

11. The system according to claim 9, wherein said received data files and expected data files are text-only data files.

12. A system for testing the design of a Universal Serial Bus (USB) smartcard device design comprising:
    a test case generator that generates test cases for USB traffic patterns of a smartcard emulator or device-under-test;
    a bus analyzer for running the test cases and generating USB bus traffic; and
    a processor operatively connected to the bus analyzer for receiving and transforming data about USB traffic into a selected data format usable across different smartcard development environments.

13. The system according to claim 12, and further comprising a recording circuit for recording USB traffic activity as USB traffic files.

14. The system A system according to claim 13, wherein said processor is operative for transforming the USB traffic files into a selected data format.

15. The system A system according to claim 12, wherein said processor is operative for recording USB traffic activity as USB traffic files that include details of USB bus traffic.

16. The system according to claim 12, and further comprising a test socket operatively connected to said bus analyzer for receiving a silicon chip of a smartcard device under test.

17. The system according to claim 12, and further comprising a smartcard reader operatively connected to said bus analyzer for receiving a smartcard device that will be tested.

18. The system according to claim 12, and further comprising a smartcard device emulator operatively connected to said bus analyzer for emulating a smartcard device.

19. The system according to claim 12, wherein said processor comprises a computer having a graphical user interface through which the bus analyzer can be controlled.

20. The system according to claim 12, wherein said processor is operative for generating text-only USB traffic generation (UTG) files that describe USB traffic to be generated.

21. The system according to claim 12, wherein said processor is operative for transforming the USB traffic files into received data files that reflect at least one of the data received about generated traffic on the USB bus and expected data files about expected data results.

22. The system according to claim 21, and wherein said processor is operative for comparing data in received data files with data in expected data files.

23. The system according to claim 21, wherein said received data files and expected data files are text-only data files.

24. A method of testing the design of a Universal Serial Bus (USB) smartcard device comprising the steps of:
    developing test cases for USB traffic patterns of a smartcard emulator or device-under-test;
    running the test cases to generate USB bus traffic;
    recording USB traffic activity as USB traffic files; and
    transforming the USB traffic files into a selected data format usable across different smartcard development environments.

25. The method according to claim 24, wherein the step of developing test cases further comprises the step of generating specified USB traffic scenarios for a host and device.

26. The method according to claim 24, and further comprising the step of developing test cases to be run as text-only USB traffic generation (UTG) files that describe USB traffic to be generated.

27. The method according to claim 24, and further comprising the step of generating the specified USB traffic scenarios within a USB bus analyzer operatively connected to an a smartcard emulator or device-under-test.

28. The method according to claim 24, and further comprising the step of running the test cases against a smartcard device as a silicon chip.

29. The method according to claim 24, and further comprising the step of running successive iterations of test cases and comparing results of the test cases to each other.

30. The method according to claim 24, and further comprising the step of transforming the USB traffic files into received data files that reflect at least one of the data received about generated traffic on the USB bus and expected data files about expected data results.

31. The method according to claim 30, and further comprising the step of comparing data in received data files with data in expected data files.

32. The method A method according to claim 30, wherein the received data files and expected data files are text-only data files.

33. A method of testing the design of a Universal Serial Bus (USB) smartcard device design comprising the steps of:
    generating USB traffic scenarios as test cases for a smartcard emulator or device under test;
    deriving expected results from the traffic scenarios;

running the test cases; and comparing actual results of the test cases to any expected results for facilitating software and hardware development of the smartcard device.

34. The method according to claim 33, and further comprising the step of recording host and device responses when running the test cases.

35. The method according to claim 33, wherein the step of developing test cases further comprises the step of generating specified USB traffic scenarios for a host and device.

36. The method according to claim 33, and further comprising the step of developing test cases to be run as text-only USB traffic generation files that describe USB traffic to be generated.

37. The method according to claim 33, and further comprising the step of generating the specified USB traffic scenarios within a USB bus analyzer operatively connected to an a smartcard emulator or device under test.

38. The method according to claim 33, and further comprising the step of running the test cases against a smartcard device as a silicon chip.

39. The method according to claim 33, and further comprising the step of running successive iterations of test cases and comparing results of the test cases to each other.

40. The method according to claim 33, and further comprising the step of transforming the USB traffic files into received data files that reflect at least one of the data received about generated traffic on the USB bus and expected data files about expected data results.

41. The method according to claim 40, and further comprising the step of comparing data in received data files with data in expected data files.

42. The method according to claim 40, wherein the received data files and expected data files are text-only data files.

* * * * *

UNITED STATES PATENT AND TRADEMARK OFFICE
CERTIFICATE OF CORRECTION

PATENT NO. : 7,127,649 B2 Page 1 of 1
APPLICATION NO. : 10/457294
DATED : October 24, 2006
INVENTOR(S) : Taylor J. Leaming It is certified that error appears in the above-identified patent and that said Letters Patent is hereby corrected as shown below:

Column 8, Line 28   Delete: "GUT "
                    Insert: -- GUI --

Column 8, Line 35   Delete: "(UTB "
                    Insert: -- (UTB) --

Column 17, Line 58  Delete: "The system A system"
                    Insert: -- The system --

Column 17, Line 61  Delete: "The system A system"
                    Insert: -- The system --

Column 18, Line 60  Delete: " The method A method "
                    Insert: -- The method --

Column 19, Line 19  Delete: " an a "
                    Insert: -- a --

Signed and Sealed this

Seventeenth Day of April, 2007

JON W. DUDAS
*Director of the United States Patent and Trademark Office*